Aug. 31, 1948.   R. H. POSTAL   2,448,461
PLURAL SYSTEMS OF SEQUENTIALLY-RESPONSIVE INSTRUMENTS
Filed April 27, 1945
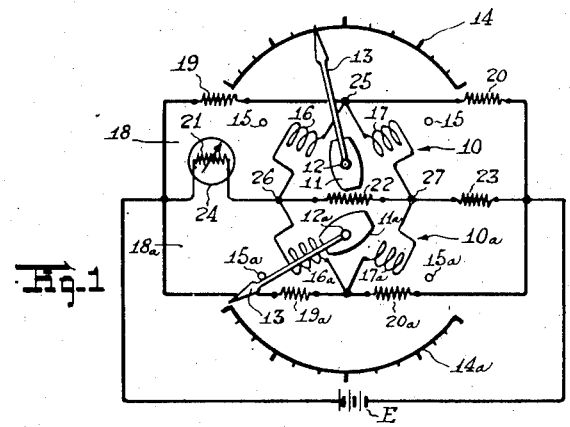
INVENTOR
ROBERT H. POSTAL
ATTORNEY Patented Aug. 31, 1948

2,448,461

UNITED STATES PATENT OFFICE 2,448,461

PLURAL SYSTEM OF SEQUENTIALLY RESPONSIVE INSTRUMENTS

Robert H. Postal, New York, N. Y., assignor to Thomas A. Edison, Incorporated, West Orange, N. J., a corporation of New Jersey Application April 27, 1945, Serial No. 590,681

10 Claims. (Cl. 177—351)

1

This invention relates to plural forms of electrical systems, especially indicating systems, and particularly to novel circuit arrangements for such systems.

The invention has particular utility and is herein illustrated and described in connection with ratiometer-type indicating instruments, but it will be understood that the invention may have useful application as well with other types of instruments.

It is an object of my invention to provide a novel electrical bridge system for energizing a plurality of indicating instruments from a common current source.

It is another object to provide a novel electrical bridge system for operating a plurality of indicating instruments in response to variation of a single condition or quantity.

It is another object to provide an electrical bridge system for a plurality of indicating instruments whereby the instruments traverse their respective indicating ranges in different order upon progressive variation of a single quantity or condition.

It is another object to provide a plural instrument arrangement wherein the respective instruments traverse their respective indicating ranges in sequence upon progressive variation of a single condition or quantity.

It is a further object to provide a plural form of energizable electrical bridge system having a common branch including means for varying the potentials therewithin.

A still further object of my invention is to provide a novel and improved plural-instrument arrangement.

Other objects and features of my invention will more fully appear from the following description and the appended claims.

In the description of my invention reference is had to the accompanying drawings, of which:

Figure 1 is a schematic diagram of a dual bridge circuit in accordance with my invention;

Figure 2 is a diagrammatic showing of a dual instrument according to my invention;

Figure 3 is a schematic diagram of a second dual bridge circuit according to my invention; and Figure 4 is a schematic diagram of a third form of dual bridge circuit according to my invention.

In Figure 1 I show diagrammatically two electrical indicating instruments 10 and 10a of the ratiometer type. These may for example be identical instruments of the form disclosed and

2 claimed in Kelly Patent No. 2,362,562 issued November 14, 1944 and having a common assignee with the present invention. For the present purposes each instrument, say instrument 10, is sufficiently described as comprising a permanent bar magnet 11 charged magnetically along its longitudinal axis and pivoted at its center 12. Carried with this magnet is a pointer 13 which moves across a scale 14 as the magnet turns on its pivot axis. The pointer has a limited indicating range defined, for example, by a pair of stop pins 15. Spaced angularly about the pivot axis 12 are two (or two sets) of coils 16 and 17. These coils are positioned so that their axes are radial to the pivot axis 12.

The operation of the instrument 10 is as follows: When only one coil 16 is energized in proper polarity the magnet 11 takes a position wherein its magnetic axis is aligned with that of the coil and the pointer then reads at the lower end portion of the scale. When only the coil 17 is energized in proper polarity the magnet takes a similar position with respect to that coil and the pointer then reads at the higher end portion of the scale. When both coils are energized, the magnet takes intermediate positions depending upon the ratio of the currents in the coils, each position of the magnet being one wherein its magnetic axis is aligned with the resultant field of the two coils. Thus as the currents vary from zero to maximum values in one coil and simultaneously from maximum to zero values in the other coil the pointer is deflected progressively across the scale.

In the instrument 10a the parts corresponding to those above described have the same reference numerals but with the suffix letter "a." Since this instrument is identical with the instrument 10 its operation is of course the same.

In accordance with the present invention, the instruments 10 and 10a are connected in a circuit system whereby they are energized from a common current source and operated in response to a single variable. Also, as will hereinafter appear, my invention contemplates novel mechanical arrangements of such instruments whereby a longer effective scale than that of either instrument is provided on which are indicated the values of a progressively variable quantity. The circuit system in which these instruments are connected comprises a novel combination of two similar electrical bridges each of which is shown by way of illustration as being of the type described and claimed in the above-mentioned Kelly patent. The bridge 18 for the instrument 10 comprises two branches in parallel connected across a current source such as a battery E. One of these branches includes resistors 19 and 20 in series and the other includes a variable resistor 21 and the resistors 22 and 23 in series, the resistor 22 being connected between resistors 21 and 23. The resistor 21 is varied to operate the instrument, as is hereinafter fully explained, and may for example be varied according to a condition to be measured, in which case the instrument is calibrated in terms of that condition; as a typical example, the resistor 21 may comprise the active element of a temperature-responsive resistor bulb 24, it being understood that this bulb is to be located remote from the other elements of the bridge in the temperature medium to be measured. The other resistors abovementioned are set to desired values and except for variation with ambient temperature are held fixed thereto.

The coils 16 and 17 are connected across the branches of the bridge 18 in such a way that they form with the middle resistor 22 an electrical delta of which the resistor 22 is the base and the coils are the sides, the apex of this delta being connected to a point 25 in the upper branch of the bridge. As resistor 21 varies, the potentials of the junction points 26 and 27, which are between resistors 21—22 and 22—23 respectively, shift relative to the potential of junction point 25 in the other branch, and the voltages impressed on the coils 16 and 17 vary in such manner that their sum remains substantially equal to the potential drop across the resistor 22. For instance, when the resistor 21 has an appropriate lower value the potential of the junction point 27 equals that of the junction point 25 and the current in the coil 16 is at a higher or maximum value and that in the coil 17 is zero to cause the pointer to read at the lower end of the scale 14. Upon progressive increase in the resistor 21 to a value whereat the potential of the junction point 26 equals that of the junction point 25, the current in coil 16 falls to zero and that in coil 17 builds up to a higher or maximum value to cause the pointer to deflect clockwise across the scale 14.

It may be here parenthetically noted that as the value of the resistor 22 is increased a greater range of variation in the resistor 21 is required to cause the pointer to traverse the scale and, vice versa, as the resistor 22 is decreased a smaller range of variation in the resistor 21 is required. Thus the resistor 22 controls the sensitivity of the instrument—i. e., the deflection of the pointer per unit change in the condition being measured.

The bridge 18a for the instrument 10a includes the branch of the bridge 18 which has the variable resistor 21 therein, and a second branch which serially includes resistors 19a and 20a, these branches being connected in parallel across the same battery E.

The coils of this instrument are connected across the branches to form a second electrical delta with the resistor 22. Upon progressive variation of the resistor 21 through an appropriate range, depending upon the adjustment of the bridge, the currents in the coils 16a and 17a will vary in the manner above explained in connection with the instrument 10 to cause the pointer 13a to traverse the scale 14a.

Ratiometers of the character herein described have a scale length of the order of 100° to 150°. In many applications there is a present need for a longer effective scale without sacrifice in the effective operating torque of the pointer. The present invention fulfills this need by appropriately locating the instruments relative to one another and so adjusting them and/or their respective bridge circuits so that their pointers traverse the respective scales in sequence upon progressive variation of the resistor 21 or of the condition influencing that resistor. When identical instruments 10 and 10a are employed, as are here considered, the sequential operation of the instruments is obtained by properly adjusting the respective electrical bridges 18 and 18a. For example, this adjustment may be effected by selecting appropriate relative values for the resistors 19 and 19a and/or resistors 20 and 20a. For the case where the pointers of the instruments 10 and 10a are to traverse their scales in the order mentioned, resistors 20 and 20a being for example equal, the resistor 19 is set to a suitably lower value than is the resistor 19a. Thus, when the resistor 21 is at the lower end of its range the pointer 13 will indicate at the lower end of the scale 14 and the pointer 13a will be urged off-scale against the lower stop 15a. As the resistor 21 is increased the pointer 13 moves clockwise across the scale 14 but the pointer 13a remains against the lower stop 15a as shown in Figure 1. When the resistor 21 has increased to a value whereat the pointer 13 is at the upper end of the scale 14, the pointer 13a will be reading at the lower end of the scale 14a. As the resistor 21 continues to increase, the pointer 13 goes off-scale against the upper stop 15 and the pointer 13a moves onwardly across the scale 14a.

By way of illustration, the instruments 10 and 10a may be mounted within a single case 28 as diagrammatically illustrated in Figure 2. The instruments are here mounted side by side so that the scale carries on without a substantial break from where the scale of the preceding instrument ends. Overlying the extremities of these scales is a mask 29 having recesses 30 and 31 for exposing the pointers 13 and 13a when they are in indicating positions. The mask however conceals the pointers from view when they are off-scale against the stops 15 and 15a. Thus as pointer 13 traverses the scale 14, pointer 13a is hidden from view. When the pointer 13 reaches the upper extremity of the scale 14, the pointer 13a is in view at the lower end of the scale 14 and as the pointer 13a moves onwardly across the scale 14a the pointer 13 moves under the mask against a stop 15 and remains hidden from view until the pointer 13a again returns to the lower end of its scale.

The sequential order of the pointer movements hereinabove described is intended as being illustrative but not limitative of my invention, for other useful plural meter arrangements may be constructed according to my invention wherein both pointers indicate simultaneously over a substantial (or the total) part of their scale ranges. Also, the different instruments may have different scales of different distribution and, for example, one may indicate a narrower range of the condition being measured than the other so as to give more accurate indications within that range.

In Figure 3 I show a revised but substantially equivalent arrangement of the dual bridge shown in Figure 1. This revised circuit arrangement comprises two bridges 32 and 32a having a common branch including the variable resistor 21 and the resistor 33 in series. The other branch of the bridge 32 includes resistors 34, 35 and 36 in series and the corresponding branch of bridge 32a includes resistors 34a, 35a and 36a in series. The coils of instruments 10 and 10a form electrical deltas with the resistors 35 and 35a, and the apexes of these deltas have a common connection to the common branch of the two bridges. It will be apparent that the operation of this dual bridge arrangement is similar to that of Figure 1 and that by appropriate relative adjustment of the resistors 34 and 34a, or 36 and 36a, the scales of the respective instruments may be shifted to different ranges of the condition being measured. In this revised circuit arrangement, moreover, it will be observed that the sensitivities of the instruments may be varied independently of one another to expand or compress the scale divisions of the respective instruments since the base resistors 35 and 35a of the electrical deltas are separate from one another and may be adjusted independently as desired.

In Figure 4 I show another form of dual bridge system according to my invention. This dual bridge distinguishes from the foregoing by the type of variable element provided in the common branch, the other elements being the same as in either of the two embodiments above described, they being shown in Figure 3 by way of example. In this case the variable element comprises any suitable potentiometric device, or the equivalent, shown here simply as a potentiometer 37 the movable contact 38 of which is associated with a resistor 39 and is connected to one side of the battery E, the other side of the battery being connected as before. When the contact 38 is at the left extremity of the resistor 39 the potential of the junction 40 in the common branch is at a value between those of the two terminals of the battery E to the extent of the potential drop appearing across the resistor 39, but when the contact is at the right extremity of the resistor 39, the potential of the junction 40 is the same as that of one of the battery terminals. Thus, upon moving the contact 38 the potential of the junction 40 shifts relative to the potentials of the outside branches of the bridge system and causes the currents in the coils to vary, and the pointers of the instruments to be deflected, in the manner above described.

While I have herein shown and described my invention in terms of ratiometer systems energized by direct current, it will be apparent to those skilled in the art that my invention applies as well to such systems which are energized by alternating current. Such and other modifications and changes may be made in the embodiments herein shown and described without departing from the scope of my invention, which I endeavor to express according to the following claims.

I claim:

1. In an electrical measuring system including two ratiometer instruments each having a pair of coils and a movable indicating element: the combination of two electrical bridges having a common branch and adapted for connection across a current source; electrical deltas connected across the branches of said bridges respectively, the sides of said deltas comprising said coil pairs respectively, and the bases of said deltas comprising resistance means serially included in said bridges; and means associated with said common branch for varying the potentials in said branch according to a condition to be measured, said electrical bridges being arranged to cause the indicating elements of said instruments to traverse their respective deflection ranges substantially in sequence upon progressive variation of the potentials in said common branch.

2. In an electrical measuring system including two ratiometer instruments each having a pair of coils and an indicating element movable according to the ratio of the currents in said coils: the combination of two electrical bridges having a common branch and adapted for connection across a current source; electrical deltas connected across the branches of said bridges respectively, the sides of said deltas comprising said coil pairs respectively, and the bases of said deltas being common and comprising a resistor in said common branch; and means in said common branch for varying the potentials in said branch, said bridges being arranged to cause said indicating elements to traverse their respective deflection ranges in sequence in response to a progressive variation of the potentials in said common branch.

3. In an electrical measuring system including two ratiometer instruments each having a pair of coils and an indicating element movable according to the ratio of the currents in said coils: the combination of two electrical bridges having a common branch and adapted for connection across a current source; electrical deltas connected across the branches of said bridges respectively, the apexes of said deltas being common and connected to a point in said common branch, the sides of said deltas comprising said coil pairs respectively, and the bases of said deltas comprising resistors serially included in the other branches of said bridges respectively; and means in said common branch for varying the potentials within said branch, said bridges being arranged to cause said indicating elements to traverse their respective deflection ranges in sequence in response to a progressive variation of the potentials in said common branch.

4. In an electrical measuring system including two electrical indicating instruments each having a pivoted indicating pointer limited to a given angular range, and means including a coil which when energized with varying current causes said pointer to deflect through said range: the combination of two electrical bridges adapted for connection across a current source and comprising as crossarms thereof the coils of said instruments respectively, said bridges having a common branch; and means included in said common branch for progressively varying the potentials in said branch to cause the pointer of one of said instruments to deflect through at least part of its said range while the pointer of the other of said instruments is held stationary at a limiting position and thereupon to cause said latter pointer to deflect through at least part of its said range while said first pointer is held stationary to a limiting position.

5. In an electrical measuring system including two electrical indicating instruments each having a pivoted indicating pointer limited to a given angular range, and means including a coil which when energized with varying current causes said pointer to deflect through said range: the combination of two electrical bridges adapted for connection across a current source and comprising as crossarms thereof the coils of said instruments respectively, said bridges having a common branch; and means included in said common branch for progressively varying the potentials in said branch to cause the pointers of said instruments to traverse their angular ranges in sequence.

6. In an electrical measuring system including two electrical indicating instruments each having a pivoted indicating pointer limited to a given angular range, and means including a coil which when energized with varying current causes said pointer to deflect through said range: the combination of two electrical bridges adapted for connection across a current source and comprising as crossarms thereof the coils of said instruments respectively, said bridges having a common branch including a controllable impedance device, and said bridges being differently adjusted to cause the pointers of said instruments, upon progressive variation of said impedance device, to traverse their respective ranges in different order.

7. In an electrical measuring system including two electrical indicating instruments each having a pivoted indicating pointer limited to a given angular range, and means including a coil which when energized with varying current causes said pointer to deflect through said range: the combination of two electrical bridges adapted for connection across a current source and comprising as crossarms thereof the coils of said instruments respectively, said bridges having a common branch; and means included in said branch for varying the potentials in said branch to cause deflections of the pointers of said instruments, said bridges being differently arranged to cause said pointers to traverse their respective ranges substantially in sequence upon progressive variation of said potential-varying means.

8. An electrical indicating system comprising a plurality of electrical measuring instruments each having a scale, a pointer movable across and beyond said scale and means including a coil energizable to move said pointer, the scales of said instruments being successively arranged and spaced from one another; a mask covering the regions beyond and between said scales; a circuit arrangement adapted for connection across a current source and connecting said coils with a variable impedance element for causing, upon progressive variation of said element, said pointers to traverse their respective scales sequentially in the order of arrangement of the scales, with each succeeding pointer moving over the lower extremity of its respective scale as the last preceding pointer moves off the upper end of its scale.

9. An electrical indicating system comprising a plurality of indicating instruments each having a scale and an indicating pointer movable across and beyond said scale; an impedance device controllable according to a condition to be measured; an energizable circuit means connecting said instruments to said impedance device for causing said pointers to traverse said respective scales sequentially in response to a progressive variation of said impedance device; and a mask covering the regions beyond said scales whereby ordinarily only one of the pointers of said plurality of instruments is in view.

10. An electrical indicating system comprising a plurality of measuring instruments each having a scale and an indicating pointer movable across and beyond said scale, the scales of said instruments being successively arranged and spaced from one another; a mask covering the regions beyond said scales for concealing said pointers from view when the pointers are off scale; a variable impedance device; and current-energizable circuit means interconnecting said instruments with said impedance device for causing the pointers of said instruments to traverse their respective scales in sequence upon progressive variation of said device.

ROBERT H. POSTAL.

REFERENCES CITED

The following references are of record in the file of this patent:

UNITED STATES PATENTS

| Number | Name | Date |
| --- | --- | --- |
| 877,312 | Evershed | Jan. 21, 1908 |
| 1,102,234 | Bliss | July 7, 1914 |
| 1,645,024 | Robin | Oct. 11, 1927 |
| 1,743,386 | Paulson | Jan. 14, 1930 |
| 2,362,562 | Kelly | Nov. 14, 1944 |